US012714978B2

(12) United States Patent
Wilson et al.

(10) Patent No.: US 12,714,978 B2
(45) Date of Patent: Aug. 25, 2026

(54) APPARATUS AND PROCESS TO PROVIDE COOLING WATER FOR AMMONIA AND OR HYDROGEN PRODUCTIONS

(71) Applicant: Air Products and Chemicals, Inc., Allentown, PA (US)

(72) Inventors: Graeme Richard Wilson, Surrey (GB); Nicolas John Haryett, Surrey (GB); Matthew William Akhurst, Rotterdam (NL)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 808 days.

(21) Appl. No.: 18/085,690

(22) Filed: Dec. 21, 2022

(65) Prior Publication Data

US 2024/0207802 A1 Jun. 27, 2024

(51) Int. Cl.

| | |
|---|---|
| ***B01J 19/00*** | (2006.01) |
| ***B01J 19/24*** | (2006.01) |
| ***C01C 1/04*** | (2006.01) |
| ***C25B 1/04*** | (2021.01) |

(Continued)

(52) U.S. Cl.

CPC ......... *B01J 19/0013* (2013.01); *B01J 19/245* (2013.01); *C01C 1/0452* (2013.01); *C01C 1/0482* (2013.01); *C01C 1/0488* (2013.01); *F28F 27/003* (2013.01); *B01J 2219/0004* (2013.01); *B01J 2219/00054* (2013.01); *B01J 2219/00103* (2013.01);

(Continued)

(58) Field of Classification Search

None

See application file for complete search history.

(56) References Cited

U.S. PATENT DOCUMENTS

| | | | | |
|---|---|---|---|---|
| 4,829,768 A | | 5/1989 | Carden | |
| 5,622,632 A | * | 4/1997 | Gallup .................. | B01D 53/52 210/669 |
| 11,512,402 B2 | * | 11/2022 | Bairamijamal ......... | C07C 41/01 |

(Continued)

FOREIGN PATENT DOCUMENTS

| | | |
|---|---|---|
| EP | 3957772 B1 | 2/2022 |
| FR | 1406884 A | 7/1965 |

(Continued)

*Primary Examiner* — John J Figueroa

(74) *Attorney, Agent, or Firm* — Matthew R. Weaver

(57) ABSTRACT

An apparatus to provide cooling water to multiple facilities including a hydrogen plant that includes electrolyzers for manufacture of hydrogen and/or an ammonia plant including ammonia manufacturing for making ammonia. The apparatus can include a first cooling tower configured to provide cooling water at a first temperature for providing cooling to elements of the ammonia manufacturing and/or hydrogen plant. The apparatus can also include a second cooling tower configured to providing cooling water at a second temperature that is higher than the first temperature for providing cooling for gas coolers and electrolyte coolers of the hydrogen plant. The first and second cooling towers can be configured to utilize sea water or fresh water. The cooling towers can also be arranged and configured to permit substantial capital cost reductions while also providing improved maintenance and safety features as well as improved operational flexibility.

13 Claims, 3 Drawing Sheets

(51) Int. Cl.
*C25B 1/27* (2021.01)
*F28F 27/00* (2006.01)

(52) U.S. Cl.
CPC ....... *B01J 2219/00159* (2013.01); *C25B 1/04* (2013.01); *C25B 1/27* (2021.01)

(56) References Cited

U.S. PATENT DOCUMENTS

2005/0265919 A1 12/2005 Lomax et al.
2013/0288143 A1 10/2013 Lee
2015/0377079 A1* 12/2015 Noureldin ............. C10K 1/046
60/671

FOREIGN PATENT DOCUMENTS

WO 2021089276 A1 5/2021
WO 2022089820 A1 5/2022

* cited by examiner

APPARATUS AND PROCESS TO PROVIDE COOLING WATER FOR AMMONIA AND OR HYDROGEN PRODUCTIONS

FIELD

The present innovation relates to providing cooling water for use as a cooling medium for different elements (e.g. heat exchangers etc.) utilized to provide cooling for ammonia manufacturing and/or hydrogen manufacturing. Some embodiments can be utilized in conjunction with green hydrogen and/or green ammonia production that may utilize renewable power sources for production of hydrogen and ammonia.

BACKGROUND

Green ammonia manufacturing can be provided so that ammonia is made by use of electricity from renewable power sources (e.g. solar power, wind power, hydro-electric power, etc.). Examples of ammonia production that can be provided from renewable power source can also be appreciated from European Patent Application Publication No. EP 3 957 772 A1 and International Publication Nos. WO 2021/089276 and WO 2022/089820, for example. Hydrogen production can be provided by use of one or more electrolyzers. An example of a system for production of hydrogen can be appreciated from U.S. Patent Application Publication No. 2022/0290309.

SUMMARY

Plants often utilize a cooling water circuit that can provide a single temperature level cooling water system for providing cooling water for a plant to use. However, we have determined that the use of a cooling water circuit to provide an output of cooling water at a single temperature can present fabrication and assembly problems for large scale operations as a large cooling circuit can be needed to provide a sufficiently large flow of cooling water for use by a facility.

Further, we have determined that this type of single temperature cooling water approach can result in generating too much cooling water at an unnecessarily low temperature. For instance, in some large-scale facilities, an entire cooling water circuit may be designed to produce water at the lowest required operating temperature even though a significant portion of that water can be used for cooling while being at a higher temperature.

We have also recognized that large scale operations can require significant flows of cooling water. Conduits and other elements used in cooling circuit to provide such water can be extremely large in size and may require custom fabrication to make and assemble conduits and other elements needed for construction of a plant. For instance, a conduit having a diameter of over 3 meters may be required in such a facility. This type of sizing issue can pose significant assembly and fabrication problems as well as making the cost associated with assembly and construction very high. Also, the sizing of other elements (e.g. tanks, etc.) may need to be extremely large that can pose similar assembly and fabrication issues (e.g. require custom designing, pose construction complications due to the large size and customer sizing, incur substantial capital costs, for fabrication and assembly, etc.).

We have developed embodiments of an apparatus and embodiments of a process that can be adapted for providing cooling water for ammonia production and/or hydrogen production that can be adapted to provide improved operational flexibility as well as lower capital costs and improved safety and maintenance features for installation and operation. Further, some embodiments can provide a reduction in operational costs associated with cooling water use and can also provide an enhanced ecological impact associated with operation. We believe embodiments can be particularly beneficial for green ammonia and green hydrogen production facilities or green ammonia production facilities that may include ammonia manufacturing that forms ammonia (NH3 or $NH_3$) from hydrogen (H2 or $H_2$) provided by a hydrogen plant and nitrogen (N2 or $N_2$) provided by an air separation unit (ASU). In some embodiments, the ASU can be a standalone unit or can be a unit that is included in the hydrogen plant to facilitate hydrogen production and nitrogen production to feed hydrogen and nitrogen to an ammonia production plant.

Embodiments can also be configured and positioned for plants that can produce hydrogen, green hydrogen, or provide liquid hydrogen production (e.g. produce hydrogen for a hydrogen pipeline supply, etc.).

For example, an apparatus for providing cooling water for ammonia manufacturing and hydrogen manufacturing can include a first cooling tower that can provide cooling water at a first temperature and a second cooling tower that can provide cooling water at a second temperature that is higher than the first temperature. The cooling water fed to these cooling towers can include sea water (e.g. pre-treated sea water, sea water treated via reverse osmosis and/or nanofiltration, etc.). The first cooling tower can provide a first stream of the cooling water at the first temperature to one or more heat exchangers as a cooling medium for cooling one or more streams for an ammonia manufacturing plant and also one or more streams for a hydrogen production plant. The first stream can be split so that a first portion of the first stream of cooling water is fed to a first heat exchanger to provide cooling for ammonia manufacturing and a second portion of the first stream of cooling water is fed to a second heat exchanger to provide cooling for hydrogen production. The second cooling tower can output a second stream of cooling water at the second temperature to feed to a third heat exchanger to provide cooling of one or more flows received from gas coolers and/or electrolyte coolers of the hydrogen production plant. The second temperature of the cooling water output from the second cooling tower can be up to 10° C. higher than the first temperature or can be another suitable temperature that is higher than the first temperature of the cooling water output from the first cooling tower. In some implementations, the second temperature can be greater than 0.5° C. higher than the first temperature and less than or equal to 10° C. higher than the first temperature, can be between 0.5° C. and 7° C. higher than the first temperature, can be between 1° C. and 10° C. higher than the first temperature or be another suitable temperature that is greater than the first temperature of the cooling water output by the first cooling tower. In some implementations, it is contemplated that the second temperature can be more than 10° C. higher than the first temperature as well (e.g. between 2° C. and 20° C. higher, between 5° C. and 15° C. higher, greater than 1° C. higher and less than or equal to 25° C. higher etc.).

The hydrogen plant (which can also be referred to as a hydrogen production plant) can be a green hydrogen plant that can include an air separation unit (ASU), and electrolyzers for production of hydrogen from water. The hydrogen plant can include transformer and rectifier coolers, gas coolers, and electrolyte coolers as well. The ammonia manufacturing can include process equipment for the formation of ammonia from hydrogen produced by the hydrogen plant and nitrogen output from the ASU. The ammonia manufacturing can be entirely powered or at least partially powered by at least one renewable power source (e.g. solar power, wind power, hydro-electric power, wave powered sources, etc.). The hydrogen production plant can also be entirely powered or at least partially powered by a renewable power source as well. The first cooling tower can be arranged and configured to provide cooling water for use by some of these plant elements (e.g. the ASU, compression system elements, deoxygenation unit(s), etc.). The second cooling tower can be arranged and configured to provide cooling water for other plant elements in which a higher temperature cooling water flow can be utilized (e.g. electrolyzer electrolyte coolers, product coolers)

In a first aspect, an apparatus for providing cooling water for ammonia and/or hydrogen production is provided. The apparatus can include a first cooling circuit comprising a first water cooling tower configured to output a first stream of cooling water at a first pre-selected temperature and a second cooling circuit comprising a second water cooling tower configured to output a second stream of cooling water at a second pre-selected temperature. The first water cooling tower can be positioned and configured to feed the first stream of cooling water to at least one of: (i) at least one first heat exchanger for cooling at least one fluid output from an ammonia plant configured to output ammonia; (ii) the ammonia plant for providing a cooling medium to the ammonia plant, (iii) at least one second heat exchanger for cooling at least one fluid output from an air separation unit (ASU) and/or hydrogen manufacturing of a hydrogen plant configured to form hydrogen, and (iv) hydrogen manufacturing of a hydrogen plant and/or an ASU to provide a cooling medium to the hydrogen plant and/or the ASU. The second water cooling tower can be positioned and configured to feed the second stream of cooling water to at least one third heat exchanger for cooling at least one fluid output from one or more gas coolers of the hydrogen plant and/or one or more electrolyte coolers of the hydrogen plant.

In embodiments where the first stream of cooling water is fed to the at least one second heat exchanger and no feeding of a portion of the first stream of cooling water to the at least one first heat exchanger occurs, the at least one second heat exchanger can be considered at least one first heat exchanger and the at least one third heat exchanger can be considered at least one second heat exchanger.

In embodiments where the first stream of cooling water is fed to (ii) the ammonia plant for providing a cooling medium to the ammonia plant and/or (iv) the hydrogen manufacturing of a hydrogen plant and/or the ASU to provide a cooling medium to the hydrogen plant and/or the ASU, the first and second heat exchangers may not be utilized and the at least one third heat exchanger can be considered at least one first heat exchanger.

In some embodiments, the first water cooling tower can be positioned and configured to feed the first stream of cooling water to only one of (i) at least one first heat exchanger for cooling at least one fluid output from an ammonia plant configured to output ammonia; (ii) the ammonia plant for providing a cooling medium to the ammonia plant, (iii) at least one second heat exchanger for cooling at least one fluid output from an air separation unit (ASU) and/or hydrogen manufacturing of a hydrogen plant configured to form hydrogen, and (iv) hydrogen manufacturing of a hydrogen plant and/or an ASU to provide a cooling medium to the hydrogen plant and/or the ASU.

In other embodiments, the first water cooling tower can be positioned and configured to feed the first stream of cooling water to only two of (i) at least one first heat exchanger for cooling at least one fluid output from an ammonia plant configured to output ammonia; (ii) the ammonia plant for providing a cooling medium to the ammonia plant, (iii) at least one second heat exchanger for cooling at least one fluid output from an air separation unit (ASU) and/or hydrogen manufacturing of a hydrogen plant configured to form hydrogen, and (iv) hydrogen manufacturing of a hydrogen plant and/or an ASU to provide a cooling medium to the hydrogen plant and/or the ASU.

For example, embodiments can be configured so that the first water cooling tower can be positioned and configured to feed the first stream of cooling water to (i) at least one first heat exchanger for cooling at least one fluid output from an ammonia plant configured to output ammonia; and/or (iii) at least one second heat exchanger for cooling at least one fluid output from an air separation unit (ASU) and/or hydrogen manufacturing of a hydrogen plant configured to form hydrogen. As another example, embodiments can be configured so that the first water cooling tower can be positioned and configured to feed the first stream of cooling water to (ii) the ammonia plant for providing a cooling medium to the ammonia plant, and/or (iv) hydrogen manufacturing of a hydrogen plant and/or an ASU to provide a cooling medium to the hydrogen plant and/or the ASU.

In a second aspect, the second pre-selected temperature can be higher than the first pre-selected temperature. The first pre-selected temperature can also be lower than the second pre-selected temperature. For instance, in some configurations, the second pre-selected temperature can be between 1° C. and 40° C. higher than the first pre-selected temperature. As another example, the second pre-selected temperature can be higher than the first pre-selected temperature and be between 10° C. and 60° C., between 30° C. and 50° C., is between 30° C. and 40° C., or is greater than 30° C. and the first pre-selected temperature can be lower than the second pre-selected temperature and be a temperature that is greater than 0° C. and less than or equal to 40° C., between 15° C. and 40° C., between 20° C. and 30° C. or between 25° C. and 30° C.

In a third aspect, the first cooling circuit can be a closed loop circuit and the second cooling circuit can be a closed loop circuit.

In a fourth aspect, the apparatus can be configured for use in a hydrogen plant and/or for hydrogen manufacturing and not utilize the ammonia plant. The hydrogen manufacturing of the hydrogen plant can include one or more electrolyzers. In some configurations, the hydrogen plant can be configured for green hydrogen production, can supply hydrogen to at least one supply line or pipeline, or can be utilized for production of liquid hydrogen.

In a fifth aspect, the apparatus can include the ammonia plant and the hydrogen plant. The hydrogen plant can be connected to the ammonia plant to feed hydrogen from the hydrogen manufacturing and nitrogen from the ASU to the ammonia plant. In such embodiments, the first water cooling tower can be positioned and configured to feed a first portion of the first stream of cooling water to the at least one first heat exchanger for cooling at least one fluid output from the ammonia plant configured to output ammonia and also feed a second portion of the first stream of cooling water to the at least one second heat exchanger for cooling at least one fluid output from the ASU of the hydrogen plant and/or hydrogen manufacturing of the hydrogen plant configured to form hydrogen. The ammonia plant can be a green ammonia plant and the hydrogen plant can be a green hydrogen production plant in some configurations. The hydrogen manufacturing of the hydrogen plant can include one or more electrolyzers.

In a sixth aspect, the apparatus can include a first expansion drum connectable between the at least one first heat exchanger between the at least one first heat exchanger and the ammonia plant, a second expansion drum connectable between the at least one second heat exchanger and the ASU and/or hydrogen manufacturing of the hydrogen plant, and/or a third expansion drum connectable between the at least one third heat exchanger and the one or more gas coolers of the hydrogen plant and/or the one or more electrolyte coolers of the hydrogen plant.

Some embodiments may utilize the first, second, and third expansion drums. Other embodiments may only utilize the second and third expansion drums. In such embodiments, the second expansion drum can be considered a first expansion drum and the third expansion drum can be considered a second expansion drum.

In yet other embodiments, only the second expansion drum or only the third expansion drum may be utilized. In such embodiments, that utilized expansion drum may be considered a first expansion drum.

In yet other embodiments, the first expansion drum and the third expansion drum may be utilized. In such embodiments, the third expansion drum may be considered a second expansion drum.

In a seventh aspect, the at least one fluid output from the ammonia plant can include water, the at least one fluid output from the ASU of the hydrogen plant and/or the hydrogen manufacturing of a hydrogen plant can include water, and the at least one fluid output from the one or more gas coolers of the hydrogen plant and/or the one or more electrolyte coolers of the hydrogen plant can include water.

In an eighth aspect, a source of water can be connected to the first cooling tower and the second cooling tower to feed water to the first cooling water to form the first stream of cooling water and the second cooling water to form the second stream of cooling water. The water of the source of water can be pre-treated sea water, include fresh water, or be pre-treated fresh water.

In a ninth aspect, the first cooling tower can also be connectable to a steam turbine condenser to feed a third portion of the first stream of cooling water to the steam turbine condenser to condense steam fed to the steam turbine condenser. This third portion can be considered a second portion of the first stream of cooling water in embodiments where a first portion of the first stream of cooling water is fed to the at least one second heat exchanger and no portion of the first stream of cooling water is fed to the at least one first heat exchanger.

In a tenth aspect, the first aspect can be combined with any one of the second through ninth aspects or any combination of the second through ninth aspects. It should therefore be appreciated that the above noted exemplary second aspect through ninth aspects (e.g. second aspect, third aspect, fourth aspect, fifth aspect, sixth aspect, seventh aspect, eighth aspect, and ninth aspect) can be incorporated into other embodiments of the apparatus. Embodiments can also utilize other elements as discussed herein.

In an eleventh aspect, a process for providing cooling water for ammonia and/or hydrogen production is provided. An embodiment of the apparatus can be configured to utilize an embodiment of this process. Embodiments of the process can include feeding a first stream of cooling water output from a first cooling tower having a first pre-selected temperature to at least one of: (i) a first heat exchanger for cooling at least one fluid output from an ammonia plant configured to output ammonia, (ii) an ammonia plant for providing a cooling medium to the ammonia plant, (iii) a second heat exchanger for cooling at least one fluid output from an air separation unit (ASU) and/or hydrogen manufacturing of a hydrogen plant configured to form hydrogen, and (iv) hydrogen manufacturing of a hydrogen plant and/or an ASU to provide a cooling medium to the hydrogen plant and/or the ASU. The process can also include feeding a second stream of cooling water output from a second cooling tower to at least one third heat exchanger for cooling at least one fluid output from one or more gas coolers of the hydrogen plant and/or one or more electrolyte coolers of the hydrogen plant, the second stream of cooling water output from the second cooling tower having a second pre-selected temperature that is greater than the first pre-selected temperature.

As noted above, in embodiments where the first stream of cooling water is fed to the at least one second heat exchanger and no feeding of a portion of the first stream of cooling water to the at least one first heat exchanger occurs, the at least one second heat exchanger can be considered at least one first heat exchanger and the at least one third heat exchanger can be considered at least one second heat exchanger.

Also (as noted above), the feeding of the first stream of cooling water output from the first cooling tower having the first pre-selected temperature can include one or two of: (i) feeding a portion of the first stream of cooling water to the at least one first heat exchanger for cooling at least one fluid output from an ammonia plant configured to output ammonia; (ii) feeding a portion of the first stream of cooling water to the ammonia plant for providing a cooling medium to the ammonia plant, (iii) feeding a portion of the first stream of cooling water to the at least one second heat exchanger for cooling at least one fluid output from the ASU and/or hydrogen manufacturing of a hydrogen plant configured to form hydrogen, and (iv) feeding a portion of the first stream of cooling water to hydrogen manufacturing of a hydrogen plant and/or an ASU to provide a cooling medium to the hydrogen plant and/or the ASU.

For example, the feeding of the first stream of cooling water output from the first cooling tower having the first pre-selected temperature can include one of feeding a first portion of the first stream of cooling water to the ammonia plant for providing the cooling medium to the ammonia plant or feeding a first portion of the first stream of cooling water to the hydrogen manufacturing of the hydrogen plant and/or the ASU to provide a cooling medium to the hydrogen plant and/or the ASU.

As another example, the feeding of the first stream of cooling water output from the first cooling tower having the first pre-selected temperature can include feeding a first portion of the first stream of cooling water to the ammonia plant for providing the cooling medium to the ammonia plant and also feeding a second portion of the first stream of cooling water to the hydrogen manufacturing of the hydrogen plant and/or the ASU to provide a cooling medium to the hydrogen plant and/or the ASU.

As yet another example, the feeding of the first stream of cooling water output from the first cooling tower having the first pre-selected temperature can include feeding a first portion of the first stream of cooling water to the at least one first heat exchanger for cooling at least one fluid output from an ammonia plant configured to output ammonia and/or feeding a second portion of the first stream of cooling water to the at least one second heat exchanger for cooling at least one fluid output from the ASU and/or hydrogen manufacturing of a hydrogen plant configured to form hydrogen.

As yet another example, the feeding of the first stream of cooling water output from the first cooling tower having the first pre-selected temperature can include one of: (A) feeding a first portion of the first stream of cooling water to the at least one first heat exchanger for cooling at least one fluid output from an ammonia plant configured to output ammonia or (B) feeding a first portion of the first stream of cooling water to the at least one second heat exchanger for cooling at least one fluid output from the ASU and/or hydrogen manufacturing of a hydrogen plant configured to form hydrogen (where the at least one second heat exchanger can be considered at least one first heat exchanger as discussed herein).

In a twelfth aspect, the feeding of the first stream of cooling water output from the first cooling tower can include feeding a first portion of the first stream of cooling water output from the first cooling tower to the at least one first heat exchanger for cooling at least one fluid output from the ammonia plant configured to output ammonia and feeding a second portion of the first stream of cooling water to the at least one second heat exchanger for cooling the at least one fluid output from the ASU of the hydrogen plant and/or hydrogen manufacturing of the hydrogen plant configured to form hydrogen.

In a thirteenth aspect, the second pre-selected temperature can be can be between 1° C. and 40° C. higher than the first pre-selected temperature for some implementations. For instance, the second pre-selected temperature can be between 10° C. and 60° C., between 30° C. and 50° C., between 30° C. and 40° C., or be greater than 30° C. and the first pre-selected temperature can be greater than 0° C. and less than or equal to 40° C., between 15° C. and 40° C., between 20° C. and 30° C. or between 25° C. and 30° C. while also being lower than the second pre-selected temperature.

In a fourteenth aspect, the first water cooling tower can be included in a first cooling circuit that is a closed loop circuit and the second water cooling tower is included in a second cooling circuit that is a closed loop circuit.

In a fifteenth aspect, the process can also include feeding hydrogen output from the hydrogen manufacturing of the hydrogen plant to the ammonia plant and feeding nitrogen output from the ASU of the hydrogen plant to the ammonia plant. Ammonia can also be formed from the nitrogen received from the ASU and the hydrogen received from the hydrogen manufacturing. In some configurations, the ammonia plant can be a green ammonia plant and the hydrogen plant can be a green hydrogen production plant. The hydrogen manufacturing of the hydrogen plant can also include one or more electrolyzers.

In a sixteenth aspect, the process can be utilized for hydrogen production in which no cooling water is fed to the at least one first heat exchanger. In such embodiments, the hydrogen production can be configured for producing hydrogen for a hydrogen pipeline, hydrogen supply line or liquid hydrogen production. In other embodiments, the hydrogen can be produced for other end uses. The hydrogen production can utilize one or more electrolyzers in such configurations.

In a seventeenth aspect, the process can also include feeding a third portion of the first stream of cooling water output from the first cooling tower to a steam turbine condenser to cool steam fed to the steam turbine condenser. As noted above, this third portion of the first stream of cooling water can be considered a second portion of the first stream of cooling water in embodiments where a first portion of the first stream of cooling water is fed to the at least one second heat exchanger and no portion of the first stream of cooling water is fed to the at least one first heat exchanger.

In an eighteenth aspect, the process can be implemented so that the at least one fluid output from the ammonia plant comprises water, the at least one fluid output from the ASU of the hydrogen plant and/or the hydrogen manufacturing of a hydrogen plant comprises water, and the at least one fluid output from the one or more gas coolers of the hydrogen plant and/or the one or more electrolyte coolers of the hydrogen plant comprises water.

In a nineteenth aspect, the process can include feeding water to the first cooling tower and the second cooling tower to form the first stream of cooling water the second stream of cooling water, the water fed to the first cooling tower and the second cooling tower can include pre-treated sea water or pre-treated fresh water.

In a twentieth aspect, an embodiment of the process can be utilized in an embodiment of an apparatus or an embodiment of a system discussed herein. The apparatus can be configured for production of hydrogen and/or production of ammonia in some embodiments.

In a twenty-first aspect, the eleventh aspect can be combined with one or more of the other above discussed aspects. It should therefore be appreciated that the above noted exemplary first aspect through tenth aspect and twelfth aspect through twentieth aspect can be incorporated into other embodiments of the process of the eleventh aspect in various different ways. Embodiments can also utilize other elements as discussed herein.

Other details, objects, and advantages of our process for providing cooling water for ammonia and hydrogen production, an apparatus for providing cooling water for ammonia and hydrogen production, a system for providing cooling water for ammonia and hydrogen production, and methods of making and using the same will become apparent as the following description of certain exemplary embodiments thereof proceeds.

BRIEF DESCRIPTION OF THE DRAWINGS

Exemplary embodiments of processes for providing cooling water for ammonia and hydrogen production, apparatuses for providing cooling water for ammonia and hydrogen production, and systems for providing cooling water for ammonia and hydrogen production, and methods of making and using the same are shown in the drawings included herewith. It should be understood that like reference characters used in the drawings may identify like components.

DETAILED DESCRIPTION

Figure 1:
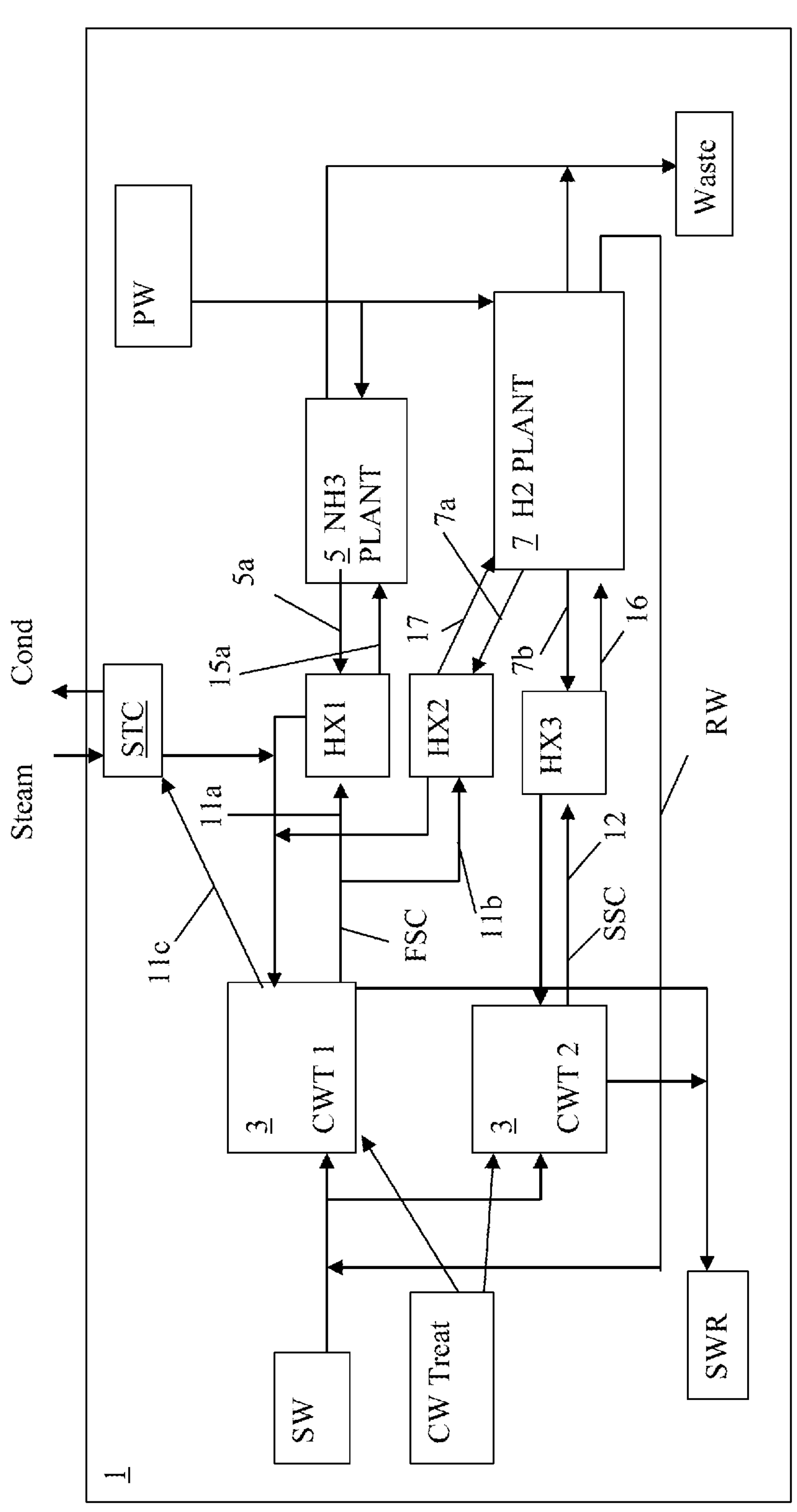
FIG. 1 is a schematic block diagram of a first exemplary embodiment of an apparatus 1 for providing cooling water for ammonia and/or hydrogen production. The schematic diagram of FIG. 1 also illustrates exemplary processes for providing cooling water for ammonia and hydrogen production.
Figure 2:
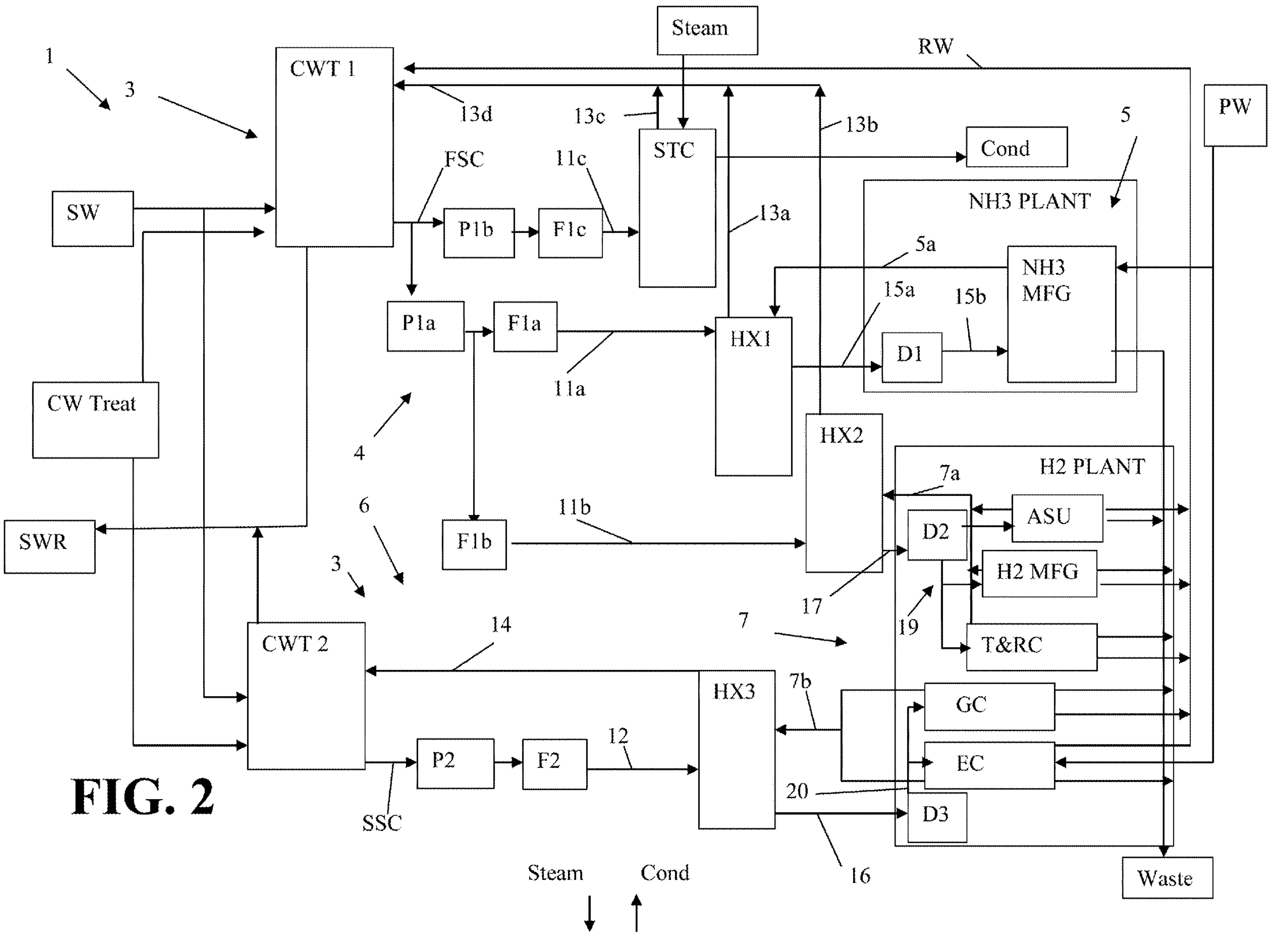
FIG. 2 is another schematic block diagram of the first exemplary embodiment of an apparatus 1 for providing cooling water for ammonia and/or hydrogen production that illustrates a more detailed exemplary arrangement of elements of the first exemplary embodiment of the apparatus 1, which can implement an exemplary process for providing cooling water for ammonia and hydrogen production.

Referring to FIGS. 1 and 2, an apparatus 1 for providing for cooling water for ammonia and/or hydrogen production can include an ammonia (NH3) plant 5 (NH3 PLANT) and a hydrogen production plant 7 (H2 PLANT), which can also be referred to herein as a hydrogen plant 7 (H2 PLANT). The ammonia plant 5 and hydrogen production plant 7 can be configured as green ammonia and green hydrogen production facilities that can utilize renewable power. The apparatus 1 can also include a plurality of cooling towers 3, which can include a first cooling tower 3 (CWT 1) and a second cooling tower 3 (CWT 2). The first cooling tower 3 (CWT 1) can be a cooling tower that can have a pre-selected number of cooling cells for cooling a first stream of cooling water to a first pre-selected temperature. The second cooling tower 3 (CWT 2) can have a pre-selected number of cooling cells for cooling a second stream of cooling water to a second pre-selected temperature that may be different from the first pre-selected temperature.

The number of cells in each cooling tower 3 can be the same or can be different numbers of cells for different embodiments. For embodiments where the first and second cooling towers are of similar type and include cells of similar dimensions, the first cooling tower CWT 1 may have more cells than the second cooling tower CWT 2 such that the first cooling tower CWT 1 may be larger than the second cooling tower CWT 2. Other embodiments can utilize different types of cooling towers that are sized differently or of a different type. For such embodiments, the first cooling tower CWT 1 may be larger than the second cooling tower CWT 2, but could also be of a similar size or even smaller depending on the overall design objectives.

The first cooling tower CWT 1 can be arranged to receive sea water SW from a source of sea water and cool that water to a pre-selected first temperature for feeding a first stream of cooling water toward a steam turbine condenser STC, a first heat exchanger HX1, and a second heat exchanger HX2. The first pre-selected temperature can be a suitable temperature such as, for example, a temperature that is greater than 0° C. and less than or equal to 40° C., a temperature that is between 5° C. and 40° C., between 25° C. and 30° C. or between 20° C. and 30° C. (e.g. less than or equal to 20° C. to less than or equal to 30° C.). For instance, the first pre-selected temperature can be 10° C., 15° C., 20° C., 25° C., 28° C. or 29° C. or less than 30° C. and more than 27° C. The sea water can be a pre-treated sea water (e.g. reverse osmosis and/or nanofiltration processed sea water, etc.).

The first heat exchanger HX1 can include a single heat exchanger or a plurality of heat exchangers. The second heat exchanger HX2 can include a single heat exchanger or a plurality of heat exchangers. The steam turbine condenser STC can include a single heat exchanger or a plurality of heat exchangers configured for condensation of the steam via the third portion of the first stream.

The first cooling tower CWT 1 can output the first stream of cooling water FSC at the first pre-selected temperature so that a first portion 11*a* of this first stream of cooling water FSC is fed to the first heat exchanger HX1, a second portion 11*b* of this first stream is fed to the second heat exchanger HX3 and a third portion 11*c* of this first stream is fed to the steam turbine condenser STC for cooling steam (Steam) fed therein so condensate (Cond.) can be output from the steam turbine condenser for being fed back toward the steam turbine. The first heat exchanger HX1 can be positioned to receive hot fluid from the ammonia manufacturing (NH3 MFG) of the ammonia plant 5 (NH3 PLANT) for cooing that hot fluid via the first portion 11*a* of the first stream of cooling water FSC. The second heat exchanger HX2 can be positioned to receive hot fluid from various elements of the hydrogen production plant (H2 PLANT) for cooling that hot fluid via the second portion 11*b* of the first stream of cooling water FSC output from the first cooling tower CWT 1. For example, the second heat exchanger HX2 can receive hot fluid from an air separation unit (ASU), hydrogen manufacturing (H2 MFG), and one or more transformer coolers and one or more rectifier coolers (T&RC) of the hydrogen production plant 7 for cooling via the second portion 11*b* of the first stream of cooling water FSC output by the first cooling tower CWT 1.

The second cooling tower CWT 2 can be arranged and configured to receive sea water SW from the source of sea water and cool that sea water to a second pre-selected temperature to provide the cooled sea water as a second stream of cooling water SSC for feeding to a third heat exchanger HX3. The second pre-selected temperature can be a suitable temperature that is also higher than the first pre-selected temperature such as, for example, a temperature between 10° C. and 60° C., between 20° C. and 40° C., between 30° C. and 35° C. or between 30° C. and 50° C. (e.g. less than or equal to 30° C. to less than or equal to 40° C.). For instance, the second pre-selected temperature can be 15° C., 20° C., 25° C., 30° C., 31° C. or 32° C. or greater than 30° C. and less than 35° C. when that temperature is also higher than the first pre-selected temperature. In other situations, it is contemplated that the second pre-selected temperature can be a temperature that is as much as 1° C. to 40° C. higher than the first pre-selected temperature or the second pre-selected temperature can be a temperature that is as much as 2° C. to 50° C. higher than the first pre-selected temperature.

The third heat exchanger HX3 can include a single heat exchanger or a plurality of heat exchangers. The third heat exchange HX3 can be configured to receive hot fluid from gas coolers (GC) and/or electrolyte coolers (EC) of the hydrogen production plant 5 (H2 PLANT) for cooling via the second stream of cooling water SSC received from the second cooling tower CWT 2.

As noted above, the second pre-selected temperature of the second stream of cooling water SSC output from the second cooling tower CWT 2 can be a temperature that is higher than the first pre-selected temperature of the first stream of cooling water output from the first cooling tower CWT 1. For example, the second pre-selected temperature can be 32° C. or other suitable temperature (e.g. a temperature between 30° C. and 40° C. or a temperature between 30° C. and 35° C. or other suitable temperature that is higher than the first pre-selected temperature, etc.) while the first pre-selected temperature can be 29° C. or another suitable temperature that is lower than the second pre-selected temperature (e.g. a temperature between 25° C. and 30° C. or a temperature between 20° C. and 30° C. that is also lower than the second pre-selected temperature).

The warmed second stream of cooling water 14 output from the third heat exchanger HX3 can be recycled back to the second cooling tower CWT 2 as heated water that can be subsequently cooled back to the second pre-selected temperature for using that recycled water to form the second stream of cooling water. The second cooling tower CWT 2 can also output a flow of output water that can be output for subsequent use as a sea water recovery SWR 430 stream. This stream can be output back to a source of sea water or fed to another plant process for dehydration or evaporation so salt can be formed from the sea water recovery stream SWR and no liquid sea water may need to be returned to an external body of water (or only a minimal amount of such liquid may ultimately need to be returned).

The warmed first, second, and third portions of the first stream of cooling water can be output from the first heat exchanger HX1, second heat exchanger HX2 and steam turbine condenser STC for being returned to the first cooling tower CWT 1 to be cooled back to the first pre-selected temperature for being output as the first stream of cooling water FSC in a closed circuit arrangement to help minimize the need for additional added water as makeup water in the first cooling circuit. The first cooling tower CWT 1 can also output a flow of output water that can be output for subsequent use as a sea water recovery SWR stream. This stream can be output back to a source of sea water or fed to another plant process for dehydration or evaporation so salt can be formed from the sea water recovery stream SWR and no liquid sea water may need to be returned to an external body of water (or only a minimal amount of such liquid may ultimately need to be returned).

The apparatus 1 can also include other elements. For example, cooling water treatment (CW Treat) may be provided from a source of treatment material. The cooling water treatment elements can include anti-corrosion material (e.g. corrosion inhibitors) and/or anti-microbial materials (e.g. germ inhibiting material) that can be injected into each cooling tower (e.g. first cooling tower CWT 1 and second cooling tower CWT 2) or into the feed of water fed to those towers to help prevent corrosion and/or formation of bacteria, mold, or other germs or microbial agents. Also, a source of potable water (PW) can provide additional water to elements of the ammonia plant 5 and/or the hydrogen plant 7. This potable water can be demineralized prior to being fed to different elements of the ammonia plant 5 and/or the hydrogen plant 7.

A portion of condensate can be output from the hydrogen plant 7 for being fed to the feed stream of water to be fed to the first cooling tower CWT 1 and/or second cooling tower CWT 2 as a recycle stream RW. This output condensate can include water, be comprised mostly of water, or be entirely water.

The ammonia plant 5 and hydrogen plant 7 can also output waste streams of water or waste streams that include water (Waste). This waste can be output for treatment or disposal via a wastewater treatment process or other type of suitable disposal process.

FIG. 2 illustrates a more detailed schematic illustration of an exemplary embodiment of the apparatus 1 for providing cooling water for ammonia and hydrogen production shown in FIG. 1 and discussed above. It should be appreciated that other designs can also be utilized as an alternative or as an addition to what is shown in the exemplary embodiment of FIG. 2.

In the exemplary embodiment of FIG. 2, the first cooling tower CWT 1 can be included in a first cooling circuit 4 and the second cooling tower CWT 2 can be included in a second cooling circuit 6.

Pre-treated sea water SW can be fed to first and second cooling towers CWT 1 and CWT 2 via a water feed conduit arrangement positioned between a source of the pre-treated sea water and the first and second cooling towers CWT 1 and CWT 2. The sea water can be pre-treated via reverse osmosis, nanofiltration, and/or other suitable pre-treatment processing.

Cooling water treatment material (CW Treat) can also be fed to the first and second cooling towers CWT 1 and CWT 2 to help avoid corrosion and formation of microbial agents (e.g. as noted above) via a treatment feed conduit arrangement positioned between a source of the treatment material and the first and second cooling towers CWT 1 and CWT 2. The treatment material can be directly fed to each cooling tower or can be fed to the feed water prior to that water being fed to the cooling towers.

The first cooling tower CWT 1 can cool the water fed therein to output a first stream of cooling water having a first pre-selected temperature. As discussed above, this first pre-selected temperature can be any suitable temperature. For instance, this first pre-selected temperature can be a temperature that is greater than 0° C. and less than or equal to 40° C., between 25° C. and 30° C., between 20° C. and 30° C. (e.g. less than or equal to 20° C. to less than or equal to 30° C.), or other suitable temperature that is less than the second pre-selected temperature. For instance, the first pre-selected temperature can be 10° C., 20° C., 25° C., 28° C., or 29° C. or less than 30° C. and more than 27° C., etc. The first pre-selected temperature can be lower than a second pre-selected temperature of the second stream of cooling water SSC that can be output from the second cooling tower CWT 2.

The first stream of cooling water FSC can be split into a first portion 11*a*, a second portion 11*b*, and a third portion 11*c*. The splitting can occur after the first stream of cooling water FSC is passed through at least one pump and at least one filtration device or can occur prior to any portions of the first stream of cooling water FSC being passed through a pump or filtration device. For example, the first stream of cooling water FSC can be split so that a some of the first stream of cooling water FSC is fed to a first pump P1*a* and the remainder of that first stream of cooling water FSC is fed to a second pump P1*b*. The cooling water output form the first pump P1*a* can be split into a first portion 11*a* and a second portion 11*b*. The first portion 11*a* can be formed for passing through a first filtration device F1*a* and subsequently being fed to the first heat exchanger HX1 to function as a cooling medium to cool at least one hotter fluid stream 5*a* the first heat exchanger HX1 receives from ammonia manufacturing (NH3 MFG) of the ammonia plant 5. The second portion 11*b* can be formed for passing through a second filtration device F1*b* before the second portion is subsequently fed to the second heat exchanger HX2 to function as a cooling medium for cooling at least one hot fluid stream 7*a* that is received by the second heat exchanger HX2 from the air separation unit (ASU), hydrogen manufacturing (H2 MFG) and/or transformer and rectifier coolers (T&RC) of the hydrogen plant 7. The hot fluid stream 7*a* can include water or be mostly water (e.g. entirely water, almost entirely water, etc.) in some embodiments. The hydrogen manufacturing (H2 MFG) can include electrolyzers. The transformer and rectifier coolers (T&RC) of the hydrogen plant 7 can include one or more transformer coolers and one or more rectifier coolers.

The first heat exchanger HX1 can output the cooled ammonia manufacturing fluid 15*a* and feed that fluid to a first expansion drum D1 for that fluid to subsequently be fed back to the ammonia manufacturing (NH3 MFG) for subsequent use. The first expansion drum D1 can be a tank or other type of vessel sized to accommodate thermal expansion of water or other fluid in the closed loop arrangement of the first cooling circuit 4. A first drum output conduit arrangement 15*b* can be positioned between the first heat exchanger HX1 and the ammonia manufacturing to facilitate the flow of the cooled fluid back to the ammonia manufacturing elements.

The second heat exchanger HX2 can output the cooled hydrogen plant fluid 17 and feed that fluid to a second expansion drum D2 for that fluid to subsequently be fed back to the ASU, hydrogen manufacturing (H2 MFG) and transformer and rectifier coolers (T&RC) for subsequent use. The second expansion drum D2 can be a tank or other type of vessel sized to accommodate thermal expansion of water or other fluid in the closed loop arrangement of the first cooling circuit 4. A second drum output conduit arrangement 19 can be positioned between the second heat exchanger HX2 and the ASU, hydrogen manufacturing, and transformer and rectifier coolers T&RC to facilitate the flow of the cooled fluid back to these elements.

A third portion 11*c* of the first stream of cooling water FSC can be fed to a second pump P1*b* and a third filtration device F1*c* before that third portion is fed to the steam turbine condenser STC for functioning as a cooling medium therein to condense steam received by the steam turbine condenser STC for forming condensate (Cond). The third filtration device F1*c* can be positioned between the second pump P1*b* and the steam turbine condenser STC.

The warmed first portion 13*a* of the first stream of cooling water FSC output from the first heat exchanger, warmed second portion 13*b* of the first stream of cooling water FSC output from the second heat exchanger HX2, and the warmed third portion 13*c* of the first stream of cooling water FSC output from the steam turbine condenser STC can be fed back to the first cooling tower CWT1 as at least one recycled water stream 13*d*. A first stream of cooling water conduit arrangement can be positioned to fluidly connect the first cooling tower CWT 1 to the pumps, filtration devices, heat exchangers, and steam turbine condenser STC for feeding the first stream of cooling water to these elements and having the warm cooling water output from these elements returned back to the first cooling tower for subsequent cooling in a closed circuit arrangement. The first cooling tower CWT 1 and its related elements for providing cooling (e.g. first heat exchanger, second heat exchanger, steam turbine condenser, pumps, filtration devices, etc.) can be considered part of a first cooling circuit 4 of the first cooling tower CWT 1.

The second cooling tower CWT 2 can cool the water fed therein to output a second stream of cooling water SSC having a second pre-selected temperature. As discussed above, this second pre-selected temperature can be any suitable temperature. For instance, this second pre-selected temperature can be a temperature that is between 10° C. and 60° C., 30° C. and 35° C. or between 30° C. and 50° C. (e.g. less than or equal to 30° C. to less than or equal to 40° C., less than or equal to 30° C. to less than or equal to 50° C., etc. and also higher than the first pre-selected temperature). As yet another example, the second pre-selected temperature can be a temperature that is as much as between 1° C. and 40° C. greater than the first pre-selected temperature. As discussed above, the second pre-selected temperature can also be another suitable temperature (or suitable temperature within another suitable temperature range) that is also higher than the first pre-selected temperature.

The second cooling tower CWT 2 can be a component of a second cooling circuit 6. The second cooling circuit 6 can be arranged and positioned so that the second stream of cooling water SSC output from the second cooling tower at the second pre-selected temperature can be fed to a third pump P2 and a fourth filtration device F2. The third pump P2 can be considered a first pump P2 of the second cooling circuit 6 and the fourth filtration device F2 can be considered a first filtration device of the second cooling circuit.

The filtered second stream of cooling water can be fed as a cooling medium feed 12 to the third heat exchanger HX3 for functioning as a cooling medium therein. The warmed cooling water 14 output from the third heat exchanger can be fed back to the second cooling tower for subsequent cooling back to the second pre-selected temperature via the second cooling tower CWT 2. A conduit arrangement can be included in the second cooling circuit 6 to facilitate the flow of the second stream of cooling water from the second cooling tower CWT 2 to the third heat exchanger HX3 as well as the return of the warmed cooling water output from the third heat exchanger HX3 back to the second cooling tower CWT 2 so this water is transported in a closed circuit arrangement to help minimize the need for additional added water as makeup water in the circuit.

The third heat exchanger HX3 can receive at least one hot fluid stream 7*b* from gas coolers GC and electrolyte coolers EC of the hydrogen plant 7 for cooling therein. The hot fluid stream 7*b* can be hotter water or include hotter water, for example (e.g. be entirely water, almost entirely water, or mostly include water, etc.). The electrolyte coolers EC can include one or more anolyte coolers and one or more catholyte coolers. The gas coolers GC can include at least one hydrogen gas coolers and/or at least one oxygen gas cooler. The cooled fluid received from the gas coolers GC and electrolyte coolers EC of the hydrogen plant 7 can be output from the third heat exchanger as a cooled fluid stream 16 for feeding to a third expansion drum D3 for that fluid to subsequently be fed back to the gas coolers GC and electrolyte coolers EC of the hydrogen plant 7 for subsequent use. The third expansion drum D3 can be a tank or other type of vessel sized to accommodate thermal expansion of water or other fluid in the closed loop arrangement of the second cooling circuit 6. A third drum output conduit arrangement 20 can be positioned between the third heat exchanger HX3 and the gas coolers GC and electrolyte coolers EC of the hydrogen plant 7 to facilitate the flow of the cooled fluid back to these elements.

As discussed above, the ammonia plant 5 can also output at least one waste stream. Th ASU, hydrogen manufacturing (H2 MFG), transformer and rectifier coolers, gas coolers, and electrolyte coolers of the hydrogen plant can also output at least one waste stream for being output for wastewater treatment or other waste treatment (Waste). The ammonia manufacturing (NH3 MFG) and electrolyte coolers EC can also receive potable water from a source of potable water PW.

Condensate output from one or more of the elements of the hydrogen plant 7 (e.g. the ASU, hydrogen manufacturing (H2 MFG), transformer and rectifier coolers T&RC, gas coolers GC, and electrolyte coolers EC) can be output from the hydrogen plant and fed back to the first cooling tower CWT 1 to provide additional makeup water as a liquid recycle stream RW to help reduce the need for additional fresh sea water to be fed to a cooling tower to account for evaporation or other water loss that may occur over time. This recycle stream RW can also, or alternatively, provide liquid to the second cooling tower as well (not shown in FIG. 2).

The first, second, and third heat exchanges HX1, HX2, and HX3 can be arranged and configured to receive cooling water for cooling one or more process streams. In some embodiments, the first heat exchanger HX1 can be positioned and configured to receive at least one hotter fluid stream 5*a* the first heat exchanger HX1 receives from ammonia manufacturing (NH3 MFG) of the ammonia plant 5 at a first ammonia manufacturing fluid temperature and output that cooled ammonia manufacturing fluid 15*a* at a first heat exchanger output temperature that is a lower temperature. This hotter fluid stream 5*a* can include water or be comprised mostly of water (e.g. be entirely water or almost entirely water). This temperature difference between the hot ammonia manufacturing fluid fed to the first heat exchanger HX1 and the temperature of the cooled ammonia manufacturing fluid 15*a* output from the first heat exchanger HX1 can be at least 3° C., at least 5° C. or be in a range of between 3° C. and 15° C. in some embodiments. Other temperature differences can also be utilized to meet a particular set of design criteria.

In some embodiments, the second heat exchanger HX2 can be positioned and configured to receive at least one hotter fluid stream 7*a* the second heat exchanger HX2 receives from the ASU, hydrogen manufacturing (H2 MFG) and transformer and rectifier coolers T&RC of the hydrogen plant 7 at a first hydrogen plant fluid inlet temperature and output that cooled hydrogen plant fluid 17 at a second heat exchanger output temperature that is a lower temperature. This temperature difference between the hotter fluid 7*a* fed to the second heat exchanger HX2 and the temperature of the cooled hydrogen plant fluid 17 output from the second heat exchanger HX2 can be at least 5° C., at least 10° C. or be in a range of between 5° and 25° C. in some embodiments. Other temperature differences can also be utilized to meet a particular set of design criteria. The fluid of the at least one hotter fluid stream 7*a* can include water or be water in some embodiments.

In some embodiments, the third heat exchanger HX3 can be positioned and configured to receive at least one hotter fluid stream 7*b* the third heat exchanger HX3 receives from the gas coolers GC and electrolyte coolers EC of the hydrogen plant 7 at a second hydrogen plant fluid inlet temperature and output that cooled hydrogen plant fluid 16 at a third heat exchanger output temperature that is a lower temperature. This temperature difference between the hotter fluid 7*b* fed to the third heat exchanger HX3 and the temperature of the cooled hydrogen plant fluid 16 output from the third heat exchanger HX3 can be at least 10° C., at least 25° C. or be in a range of between 5° and 40° C. in some embodiments. Other temperature differences can also be utilized to meet a particular set of design criteria. The fluid of the at least one hotter fluid stream 7*b* can include water or be water in some embodiments.

Each of the first, second, and third heat exchangers HX1, HX2, and HX3 can be structured as any type of suitable heat exchanger. In some embodiments, these heat exchangers can each include one or more plate heat exchangers, one or more shell and tube heat exchangers, one or more finned tube heat exchangers, or include combinations of these types of heat exchangers.

It should also be appreciated that each of the pumps (e.g. first pump P1*a*, second pump P1*b*, third pump P2, etc.) can be a single pump or include a plurality of pumps for driving the flow of cooling water at a desired flow rate and/or pressure. Also, the operational conditions for the first and second cooling circuits 4 and 6, heat exchanges, and other elements can be adjusted to meet a particular set of design criteria. The pressure, temperature and flow rates for various process streams or units may therefore be adapted to meet the needs of a particular implementation.

The first and second cooling towers CWT 1 and CWT 2 can each output a flow of water as a sea water recovery stream SWR. This stream can be used for further use in a plant or can be output for delivery to a body of water that may be the source of the sea water.

In some embodiments, the first and second cooling towers CWT 1 and CWT 2 can be positioned and configured for use for hydrogen production (e.g. green hydrogen production, production of hydrogen for a hydrogen supply line, production of liquid hydrogen, etc.). In such embodiments, the ammonia manufacturing related elements may not be included in the embodiments. For instance, such embodiments may not utilize the ammonia plant (NH3 Plant) 5 or the first heat exchanger HX1. In such embodiments, the second heat exchanger HX2 can be considered a first heat exchanger and the third heat exchanger HX3 can be considered a second heat exchanger. Also, in such embodiments other related equipment may not be used (e.g. the entire first stream of cooling water FSC can be fed to the second heat exchanger HX2 or can be fed to the second heat exchanger HX2 and the steam turbine condenser STC so there may not be conduit arrangements associated with the first portion 11*a* of the first stream of the cooling water FSC as well as other elements associated with the first portion 11*a* of the first stream of cooling water FSC, etc.).

Embodiments of the apparatus 1 can provide significant operational improvements and fabrication improvements. For example, the utilization of multiple cooling circuits each having at least one cooling tower can permit the cooling towers to be smaller sized for lower capital costs for those units and can also permit cooling water to be provided at multiple different cooling temperatures (e.g. the above noted first pre-selected temperature and second pre-selected temperature). Embodiments can permit a smaller second cooling tower CWT 2 to be utilized, which can also provide a significant portion of the cooling provided by the cooling water of the apparatus 1 (e.g. over 50% of the overall cooling, between 45% and 60% of the overall cooling, at least 50% of the overall cooling, more than 45% of the overall cooling and less than 80% of the overall cooling, etc.). The combination of the smaller second cooling tower CWT 2 that can provide a hotter cooling water outlet temperature suitable for use by various elements of the hydrogen plant 7 can provide significant operational flexibility, reduced capital costs, and allow a large amount of water utilized in the cooling for the ammonia plant 5 and hydrogen plant 7 to be avoid being overcooled to an unnecessarily low temperature. Such features can permit smaller cooling towers to be used (e.g. simpler, less costly devices that can be easier and less costly to build, use and maintain) and also permit a more efficient use of the cooling water by providing different sources of cooling mediums for use in cooling different process streams.

The utilization of multiple closed loop cooling circuits such as the exemplary first cooling circuit 4 and second cooling circuit 6 discussed above can also provide safety and maintenance features. For instance, if an accident or leak occurs that may affect the ammonia plant 5 (e.g. a leak of ammonia that could get into the fluid of the first cooling circuit 4), the ammonia plant 5 can be shut down without affecting hydrogen production of the hydrogen plant 7 or requiring a shut down of the second cooling circuit 6.

Additionally, embodiments can permit the various conduits utilized in the apparatus 1 for the transport of the fluids to be cooled via first, second, and third heat exchangers HX1, HX2, and HX3, as well as the conduits used to convey the first and second streams of cooling water FSC and SSC to and from the cooling towers 3 to be substantially smaller in size. For instance, conduits can include diameters not more than 3 meters in diameter (e.g. the largest conduits in the cooling circuits can be no more than 3 meters, less than 2.7 meters or less than 1.9 meters in diameter at their largest sizes). This size reduction also permits the other elements to be sized smaller (e.g. smaller heat exchangers, etc.). Such embodiments can avoid requiring use of customized sized piping or valves or other specialty equipment to accommodate very large diameter conduits, which can reduce capital costs and also permit fabrication of a plant or apparatus 1 to be performed much more quickly and more efficiently.

Embodiments can also be adapted to help minimize the amount of water that may be output from the cooling towers 3 for return to a body of water. Some embodiments may fully eliminate such water while others may minimize it. Embodiments can provide flexibility so a large part, if not all, of such water can be dehydrated to form salt. If water is output for return to a source of the water (e.g. a sea, etc.), the output can be limited so that it can minimize the ecological impact associated with the output of too much hot water back to a body of water (e.g. avoid algae blooms, etc.).

Embodiments can also be provided that can limit the types of corrosion inhibitor and antimicrobial agents provided as cooling water treatment material (CW Treat) so that such salt that is formed can be considered safe for human consumption or safe for animal consumption in some implementations.

Embodiments can also permit the first and second cooling circuits 4 and 6 to be utilized in a manner that can help eliminate the need for additional cooling loops for some plant specific equipment (e.g. electrolyzers of the hydrogen plant 7). By providing for a recycling of warmed water output from the heat exchangers, embodiments can also provide a reduction in fresh water additions needed for the cooling circuits so that a reduction in water use may also be provided.

Embodiments can utilize sea water or fresh water. In some implementations, the treated sea water can be desalinated water or the source of the cooling water can be water from a fresh water source (e.g. a river).

In the event embodiments utilize fresh water, the first and second heat exchangers HX1 and HX2 may not be needed or utilized. In such an implementation, the third heat exchanger HX3 can be considered a first heat exchanger HX3. An example of such an embodiment is shown in FIG. 3.

Figure 3:
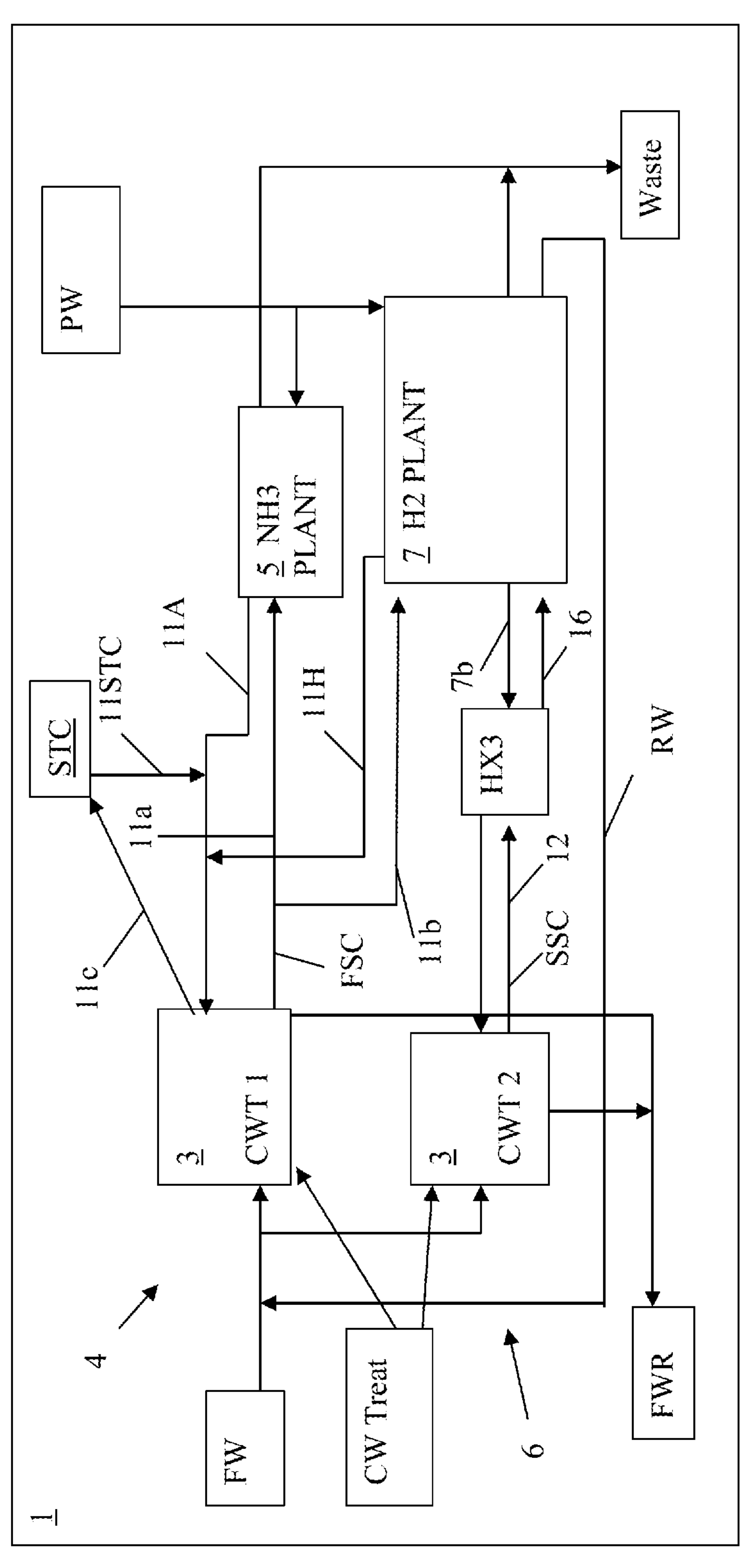
FIG. 3 is a schematic block diagram of a second exemplary embodiment of an apparatus 1 for providing cooling water for ammonia and/or hydrogen production. The schematic diagram of FIG. 3 also illustrates exemplary processes for providing cooling water for ammonia and/or hydrogen production.

Referring to FIG. 3, the apparatus 1 for providing for cooling water for ammonia and/or hydrogen production can include the ammonia (NH3) plant 5 (NH3 PLANT) and the hydrogen production plant 7 (H2 PLANT). The apparatus 1 can also include a plurality of cooling towers 3, which can include a first cooling tower 3 (CWT 1) and a second cooling tower 3 (CWT 2). The first cooling tower 3 (CWT 1) can be a cooling tower that can have a pre-selected number of cooling cells for cooling a first stream of cooling water to a first pre-selected temperature. The second cooling tower 3 (CWT 2) can have a pre-selected number of cooling cells for cooling a second stream of cooling water to a second pre-selected temperature that may be different from the first pre-selected temperature. The first cooling tower 3 (CWT 1) can be part of a first cooling circuit 4 and the second cooling tower 3 (CWT 2) can be part of a second cooling circuit 6.

The number of cells in each cooling tower 3 can be the same or can be different numbers of cells for different embodiments. For embodiments where the first and second cooling towers are of similar type and include cells of similar dimensions, the first cooling tower CWT 1 may have more cells than the second cooling tower CWT 2 such that the first cooling tower CWT 1 may be larger than the second cooling tower CWT 2. Other embodiments can utilize different types of cooling towers that are sized differently or of a different type. For such embodiments, the first cooling tower CWT 1 may be larger than the second cooling tower CWT 2, but could also be of a similar size or even smaller depending on the overall design objectives.

The first cooling tower CWT 1 can be arranged to receive fresh water FW from a source of fresh water (e.g. lake, river, etc.) and cool that water to a pre-selected first temperature for feeding a first stream of cooling water toward a steam turbine condenser STC, the ammonia plant 5 (NH3 PLANT) and the hydrogen production plant 7 (H2 PLANT) for cooling plant elements of the ammonia plant 5 and/or hydrogen production plant 7 and use in the steam turbine condenser STC. As discussed above with respect to the embodiment of FIGS. 1-2, the first pre-selected temperature can be a suitable temperature such as, for example, a temperature that is greater than 0° C. and less than or equal to 40° C., a temperature that is between 5° C. and 40° C., between 25° C. and 30° C. or between 20° C. and 30° C. (e.g. less than or equal to 20° C. to less than or equal to 30° C.). For instance, the first pre-selected temperature can be 10° C., 15° C., 20° C., 25° C., 28° C. or 29° C. or less than 30° C. and more than 27° C. The fresh water can be a pre-treated fresh water (e.g. reverse osmosis and/or nano-filtration processed sea water, etc.).

As discussed above with respect to the embodiment of FIGS. 1 and 2, the steam turbine condenser STC can include a single heat exchanger or a plurality of heat exchangers configured for condensation of the steam via the third portion of the first stream.

The first cooling tower CWT 1 can output the first stream of cooling water FSC at the first pre-selected temperature so that a first portion 11*a* of this first stream of cooling water FSC is fed to the ammonia plant 5 ((NH3 PLANT), a second portion 11*b* of this first stream can be fed to the hydrogen production plant 7 (H2 PLANT), and a third portion 11*c* of this first stream is fed to the steam turbine condenser STC for cooling steam (Steam) fed therein so condensate (Cond.) can be output from the steam turbine condenser for being fed back toward the steam turbine. The first portion 11*a* can be fed to ammonia manufacturing (NH3 MFG) of the ammonia plant 5 (NH3 PLANT) for cooing hot fluid and/or process elements of the ammonia manufacturing via the first portion 11*a* of the first stream of cooling water FSC. The second portion 11*b* can be fed to the hydrogen production plant (H2 PLANT) 7 cool hot fluid from one or more various elements of the hydrogen production plant (H2 PLANT) or process units of that plant for cooling via the second portion 11*b* of the first stream of cooling water FSC output from the first cooling tower CWT 1. For example, hot fluid from an air separation unit (ASU), hydrogen manufacturing (H2 MFG), and one or more transformer coolers and one or more rectifier coolers (T&RC) of the hydrogen production plant 7 can receive the second portion 11*b* to function as a cooling medium via the second portion 11*b* of the first stream of cooling water FSC output by the first cooling tower CWT 1.

The second cooling tower CWT 2 can be arranged and configured to receive fresh water FW from the source of fresh water and cool that fresh water to a second pre-selected temperature to provide the cooled fresh water as a second stream of cooling water SSC for feeding to a third heat exchanger HX3. As noted above, the third heat exchanger HX3 can be considered a first heat exchanger in this embodiment since the first and second heat exchangers HX1 and HX2 are not utilized in this embodiment.

As discussed above, the second pre-selected temperature can be a suitable temperature that is also higher than the first pre-selected temperature such as, for example, a temperature between 10° C. and 60° C., between 20° C. and 40° C., between 30° C. and 35° C. or between 30° C. and 50° C. (e.g. less than or equal to 30° C. to less than or equal to 40° C.). For instance, the second pre-selected temperature can be 15° C., 20° C., 25° C., 30° C., 31° C. or 32° C. or greater than 30° C. and less than 35° C. when that temperature is also higher than the first pre-selected temperature. In other situations, it is contemplated that the second pre-selected temperature can be a temperature that is as much as 1° C. to 40° C. higher than the first pre-selected temperature or the second pre-selected temperature can be a temperature that is as much as 2° C. to 50° C. higher than the first pre-selected temperature.

As discussed above, the third heat exchanger HX3 (which is considered a first heat exchanger in this embodiment) can include a single heat exchanger or a plurality of heat exchangers. The heat exchange HX3 can be configured to receive hot fluid from gas coolers (GC) and/or electrolyte coolers (EC) of the hydrogen production plant 5 (H2 PLANT) for cooling via the second stream of cooling water SSC received from the second cooling tower CWT 2.

As noted above, the second pre-selected temperature of the second stream of cooling water SSC output from the second cooling tower CWT 2 can be a temperature that is higher than the first pre-selected temperature of the first stream of cooling water output from the first cooling tower CWT 1. For example, the second pre-selected temperature can be 32° C. or other suitable temperature (e.g. a temperature between 30° C. and 40° C. or a temperature between 30° C. and 35° C. or other suitable temperature that is higher than the first pre-selected temperature, etc.) while the first pre-selected temperature can be 29° C. or another suitable temperature that is lower than the second pre-selected temperature (e.g. a temperature between 25° C. and 30° C. or a temperature between 20° C. and 30° C. that is also lower than the second pre-selected temperature).

The warmed second stream of cooling water 14 output from the heat exchanger HX3 can be recycled back to the second cooling tower CWT 2 as heated water that can be subsequently cooled back to the second pre-selected temperature for using that recycled water to form the second stream of cooling water. The second cooling tower CWT 2 can also output a flow of output water that can be output for subsequent use as a fresh water recovery FWR stream. This stream can be output back to a source of fresh water or fed to another plant process for dehydration or evaporation and no liquid fresh water may need to be returned to an external body of water (or only a minimal amount of such liquid may ultimately need to be returned).

The warmed first, second, and third portions of the first stream of cooling water can be output from the ammonia plant 5 (NH3 PLANT) as warmed first portion of 11A, output from the hydrogen production plant 7 (H2 PLANT) as warmed second portion 11H, and steam turbine condenser STC as warmed third portion 11STC for being returned to the first cooling tower CWT 1 to be cooled back to the first pre-selected temperature for being output as the first stream of cooling water FSC in a closed circuit arrangement to help minimize the need for additional added water as makeup water in the first cooling circuit or in an open circuit arrangement. The first cooling tower CWT 1 can also output a flow of output water that can be output for subsequent use as a fresh water recovery FWR stream. This stream can be output back to a source of fresh water or fed to another plant process for dehydration or evaporation so no liquid fresh water may need to be returned to an external body of water (or only a minimal amount of such liquid may ultimately need to be returned).

It should be appreciated that the exemplary embodiment of the apparatus 1 of FIG. 3 can also include other elements. For example, cooling water treatment (CW Treat) may be provided from a source of treatment material. The cooling water treatment elements can include anti-corrosion material (e.g. corrosion inhibitors) and/or anti-microbial materials (e.g. germ inhibiting material) that can be injected into each cooling tower (e.g. first cooling tower CWT 1 and second cooling tower CWT 2) or into the feed of water fed to those towers to help prevent corrosion and/or formation of bacteria, mold, or other germs or microbial agents. Also, a source of potable water (PW) can provide additional water to elements of the ammonia plant 5 and/or the hydrogen plant 7. This potable water can be demineralized prior to being fed to different elements of the ammonia plant 5 and/or the hydrogen plant 7.

A portion of condensate can be output from the hydrogen plant 7 for being fed to the feed stream of water to be fed to the first cooling tower CWT 1 and/or second cooling tower CWT 2 as a recycle stream RW as well. This output condensate can include water, be comprised mostly of water, or be entirely water.

The ammonia plant 5 and hydrogen plant 7 can also output waste streams of water or waste streams that include water (Waste). This waste can be output for treatment or disposal via a wastewater treatment process or other type of suitable disposal process.

It should be appreciated that some embodiments can be utilized only for hydrogen production via the hydrogen production plant 7 (H2 PLANT). In such embodiments, the ammonia plant 5 (HN3) plant and the formation of the first portion 11*a* (and return of the warmed first portion 11A) may not be utilized. Instead, the second portion 11*b* and the third portion 11*c* of the first stream of cooling water FSC can be utilized. In such an implementation, the third portion 11*c* of the first stream of cooling water FSC that is fed to the steam turbine condenser STC can be considered a first portion or a second portion of the first stream of cooling water FSC. In implementations where the portion of the first stream of cooling water FSC fed to the steam turbine condenser STC is considered a second portion, the second portion 11*b* can be considered a first portion of the first stream of cooling water FSC.

Embodiments of our apparatus, system, and process can provide significant improvements in operational flexibility, significantly improved profitability by reducing capital costs for providing cooling water for use in hydrogen production and ammonia production, and also provide maintenance and safety benefits associated with implementation and operation. Further, embodiments can be adapted to improve the environmental impact that ammonia production and/or hydrogen generation industrial processes may have by reducing or avoiding how much heated cooling water output from a cooling tower may be output for feeding back to a body of water.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different elements (e.g. pumps, heat exchangers, cooling towers, etc.) can be arranged to meet a particular plant layout design that accounts for available area of the plant, sized equipment of the plant, and other design considerations. As another example, the flow rate, pressure, and temperature of the fluid passed through the various apparatus or system elements can vary to account for different design configurations and other design criteria.

Embodiments of a plant, the apparatus for providing cooling water for ammonia and hydrogen production, process for providing cooling water for ammonia and hydrogen production, and/or system for providing cooling water for ammonia and hydrogen production can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system and methods of making and using the same have been shown and described above, it is to be distinctly understood that the invention is not limited thereto but may be otherwise variously embodied and practiced within the scope of the following claims.

What is claimed is:

1. An apparatus for providing cooling water for ammonia and/or hydrogen production comprising:

an ammonia plant configured to output ammonia;

a hydrogen plant configured to form hydrogen, the hydrogen plant connected to the ammonia plant to feed hydrogen from hydrogen manufacturing and nitrogen from an ASU to the ammonia plant;

a first cooling circuit comprising a first water cooling tower configured to output a first stream of cooling water at a first pre-selected temperature; and a second cooling circuit comprising a second water cooling tower configured to output a second stream of cooling water at a second pre-selected temperature;

the first water cooling tower is positioned and configured to feed a first portion of the first stream of cooling water to at least one first heat exchanger for cooling at least one fluid output from the ammonia plant and also feed a second portion of the first stream of cooling water to at least one second heat exchanger for cooling at least one fluid output from the ASU and/or the hydrogen manufacturing of the hydrogen plant; and the second water cooling tower positioned and configured to feed the second stream of cooling water to at least one third heat exchanger for cooling at least one fluid output from one or more gas coolers of the hydrogen plant and/or one or more electrolyte coolers of the hydrogen plant.

2. The apparatus of claim 1, wherein the second pre-selected temperature is higher than the first pre-selected temperature.

3. The apparatus of claim 2, wherein the second pre-selected temperature is between 10° C. and 60° C. and wherein the first pre-selected temperature is greater than 0° C. and less than or equal to 40° C.

4. The apparatus of claim 1, wherein the first cooling circuit is a closed loop circuit and the second cooling circuit is a closed loop circuit.

5. The apparatus of claim 1, wherein the ammonia plant is a green ammonia plant and the hydrogen plant is a green hydrogen production plant.

6. The apparatus of claim 1, wherein the hydrogen manufacturing of the hydrogen plant includes one or more electrolyzers.

7. The apparatus of claim 1, comprising:

a first expansion drum connectable between the at least one first heat exchanger between the at least one first heat exchanger and the ammonia plant;

a second expansion drum connectable between the at least one second heat exchanger and the ASU and/or hydrogen manufacturing of the hydrogen plant; and/or a third expansion drum connectable between the at least one third heat exchanger and the one or more gas coolers of the hydrogen plant and/or the one or more electrolyte coolers of the hydrogen plant.

8. The apparatus of claim 1, wherein the at least one fluid output from an ammonia plant comprises water, the at least one fluid output from the ASU and/or the hydrogen manufacturing of a hydrogen plant comprises water, and the at least one fluid output from the one or more gas coolers of the hydrogen plant and/or the one or more electrolyte coolers of the hydrogen plant comprises water.

9. The apparatus of claim 1, comprising:

a source of water connected to the first cooling tower and the second cooling tower to feed water to the first cooling water to form the first stream of cooling water and the second cooling water to form the second stream of cooling water; and wherein the water of the source of water is pre-treated sea water or is pre-treated fresh water.

10. The apparatus of claim 1, wherein the first cooling tower is also connectable to a steam turbine condenser to feed a third portion of the first stream of cooling water to the steam turbine condenser to condense steam fed to the steam turbine condenser.

11. The apparatus of claim 1, wherein the first water cooling tower is positioned and configured to feed the first stream of cooling water to one or two of:

(i) the at least one first heat exchanger for cooling the at least one fluid output from an ammonia plant configured to output ammonia;

(ii) the ammonia plant for providing the cooling medium to the ammonia plant, (iii) the at least one second heat exchanger for cooling the at least one fluid output from the ASU and/or the hydrogen manufacturing of the hydrogen plant configured to form hydrogen, and (iv) the hydrogen manufacturing of the hydrogen plant and/or the ASU to provide a cooling medium to the hydrogen plant and/or the ASU.

12. The apparatus of claim 11, wherein the first water cooling tower is positioned and configured to feed the first stream of cooling water to (ii) the ammonia plant for providing the cooling medium to the ammonia plant and/or (iv) the hydrogen manufacturing of the hydrogen plant and/or the ASU to provide a cooling medium to the hydrogen plant and/or the ASU.

13. The apparatus of claim 11, wherein the first water cooling tower is positioned and configured to feed the first stream of cooling water to (i) the at least one first heat exchanger for cooling the at least one fluid output from an ammonia plant configured to output ammonia and/or (iii) the at least one second heat exchanger for cooling the at least one fluid output from the ASU and/or the hydrogen manufacturing of the hydrogen plant configured to form hydrogen.

* * * * *